United States Patent [19]
Chen

[11] Patent Number: 5,396,556
[45] Date of Patent: Mar. 7, 1995

[54] CELLULAR PHONE SECURING DEVICE FOR USE INSIDE A VEHICLE

[75] Inventor: Stephen Chen, Changhua, Taiwan, Prov. of China

[73] Assignee: E Lead Electronic Co., Ltd., Changhua, Taiwan, Prov. of China

[21] Appl. No.: 221,491

[22] Filed: Apr. 1, 1994

[51] Int. Cl.⁶ .............................................. H04M 1/00
[52] U.S. Cl. .................. 379/446; 379/454; 379/455; 379/426
[58] Field of Search ............... 379/446, 426, 454, 455, 379/449

[56] References Cited

U.S. PATENT DOCUMENTS 5,179,590  1/1993  Wang ................................. 379/446
5,305,381  4/1994  Wang et al. ....................... 379/455

*Primary Examiner*—James L. Dwyer
*Assistant Examiner*—Jack Chiang
*Attorney, Agent, or Firm*—Browdy and Neimark

[57] ABSTRACT

A cellular phone securing device has a fixing unit and a flexible tube, a linkage rod and a phone securing mount. The fixing unit is provided with a horizontal slide board, and a vetical contact member and a pair of bolts. The slide board and the contact member are one way adjustably limited in place and the bolts are selectively attached to the underside Of the fixing unit. In mounting of the securing device, the slide board and the contact member are adjusted to abut against a windshield of a vehilce and the bolts are in abutment with the edges of outlets of a ventilation system of the vehicle whereby the bolts and the slide board and the contact member constitute a three-point supporting of the fixing unit. The phone securing mount is adhered to a flat place of the front console board of the vehicle.

1 Claim, 5 Drawing Sheets

CELLULAR PHONE SECURING DEVICE FOR USE INSIDE A VEHICLE

BACKGROUND OF THE INVENTION

The present invention relates to a hand-free cellular phone securing or retaining device mounted inside a vehicle so that a driver can drive his or her car and make or receive a phone call without holding a phone receiver in his or her hand, rendering driving in a more safe way.

Cellular phones have been so popular that they have almost become a standard equipment in modern vehicles. In some countries, a driver is prohibited from holding a cellular phone while driving a vehicle with one hand, so it is necessary for a driver to fix a cellular phone inside a vehicle if he or she wants to use a cellular phone in driving without violation of law.

It is well known that holding a cellular phone with one hand and using the other hand to control the steering wheel while driving is very dangerous. To overcome such a problem, a cellular phone is usually held in place inside a vehicle by way of a securing device which is mounted to a place by screws near the gear shift, or to a place above a dashboard. Fixing a cellular phone at such places either makes the operation of the phone inconvenient or influences the sight of a driver; besides, it also damages the interior of a vehicle by drilling holes on the body of a vehicle.

SUMMARY OF THE INVENTION

Therefore, the primary object of the present invention is to provide a securing device for fixing a cellular phone inside a vehicle so,as to permit a driver to make a phone call or receive one in driving without using his or her hand to hold the phone receiver.

Another object of the present invention is to provide a securing device for fixing a cellular phone which is mounted to a vehicle in a non-destructive manner.

BRIEF DESCRIPTION OF THE DRAWINGS

FIG. 5A is an enlarged diagram showing part of FIG. 5;

DETAILED DESCRIPTION OF THE PREFERRED EMBODIMENT

Figure 1:
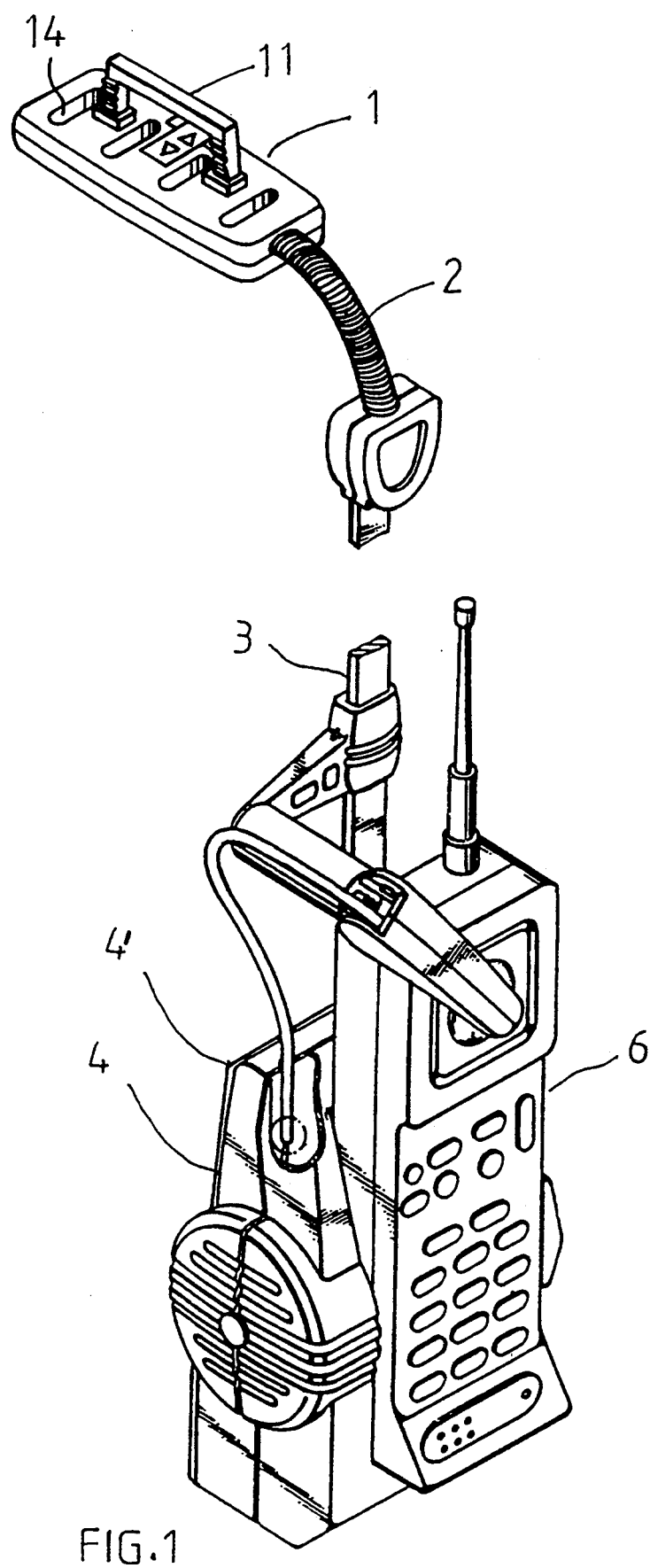
FIG. 1 is a perspective diagram showing the present invention.
Figure 2:
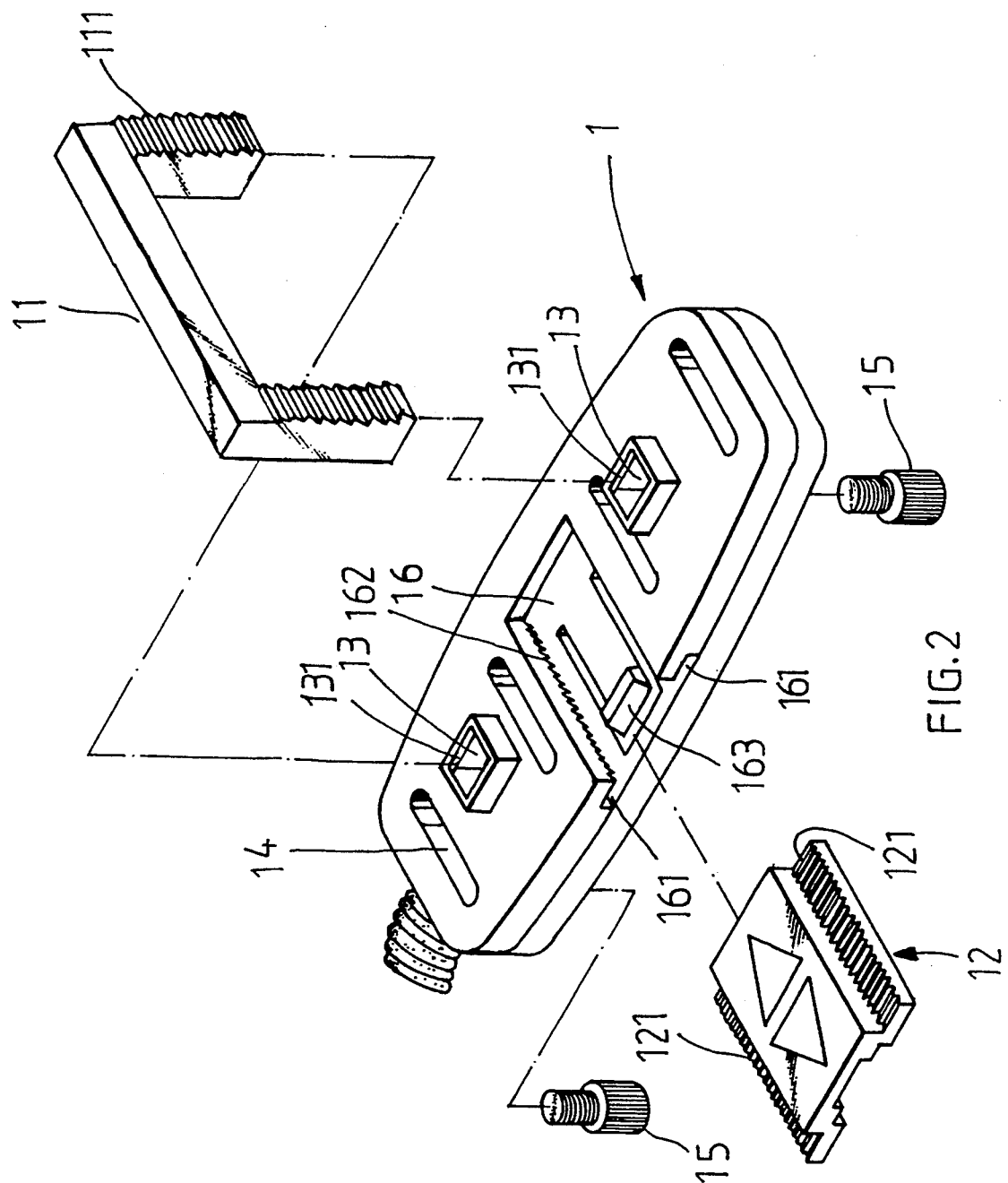
FIG. 2 is a perspective diagram showing the exploded components of a part of the present invention.

Referring to FIGS. 1, 2, the present invention illustrated in a perspective and exploded manner is comprised of a fixing unit 1; a flexible tube 2; a linkage rod 3; and a phone securing mount 4 wherein the fixing unit 1 is connected to the flexible tube 2 at one end and the flexible tube 2 is further engaged with the linkage rod 3 at the other end, and the linkage rod 3 is coupled to the phone securing mount 4 at the other end.

The fixing unit 1 has a number of through holes 14 which permit air delivered from a ventilation system of a vehicle to pass. There are two symmetric mounting seats 13 disposed on the fixing unit 1, each being disposed at one end thereof whereby a C-shaped adjustable member 11 having a plurality of teeth 111 disposed at each end thereof is able to engage with the fixing unit 1.

In each mounting seat 13 is disposed a one-way detention tooth 131 in selective engagement with the multiple teeth 111 of the vertically disposed adjustable contact member 11 so as to provide a one way upward adjustment of the adjustable contact member 11.

At the center of the fixing unit 1 is disposed a recess 16. A slide track 161 is disposed at each of two parallel sides of the recess 16. On the ceiling of each slide track 161 is disposed a plurality of teeth 162. A horizontally movable slide board 12 has a plurality of teeth 121 on each of two parallel sides thereof which are in one-way detention engagement with the teeth 162 of the slide track 161 so that the slide board 12 can only one-way moveable outwardly.

Figure 3:
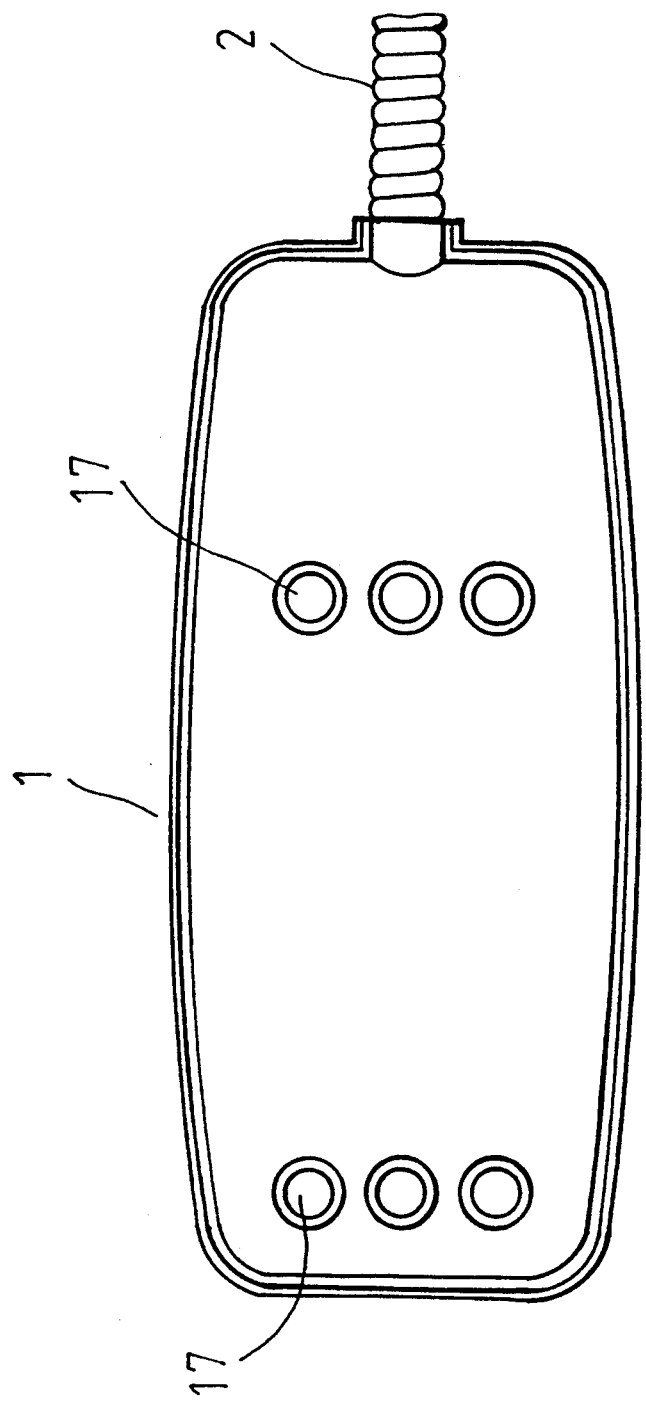
FIG. 3 is a plane view showing the disposition of the screw holes on the rear of the fixing unit of the present invention.

A resilient abutment piece 163 is disposed at the center of the recess 16 and is in abutment against the bottom of the slide board 12. As shown in FIG. 3, there are Several screw holes 17 disposed on the bottom of the fixing unit 1 so as to permit bolts 15 to be selectively engaged with the fixing unit 1.

Figure 5:
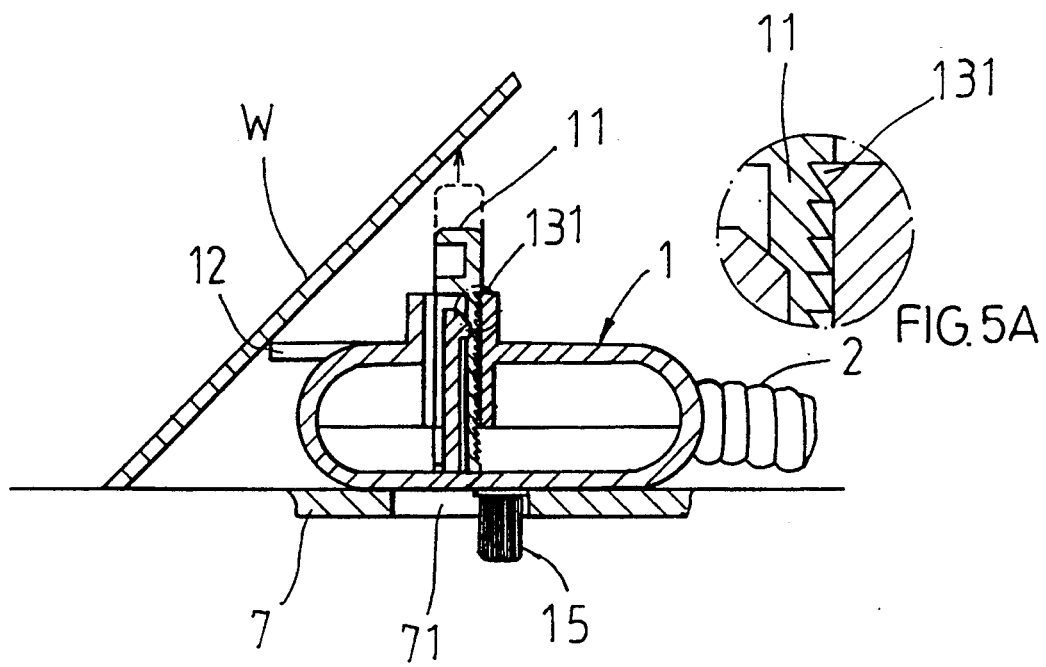
FIG. 5 is another diagram showing the operation thereof.
Figure 4:
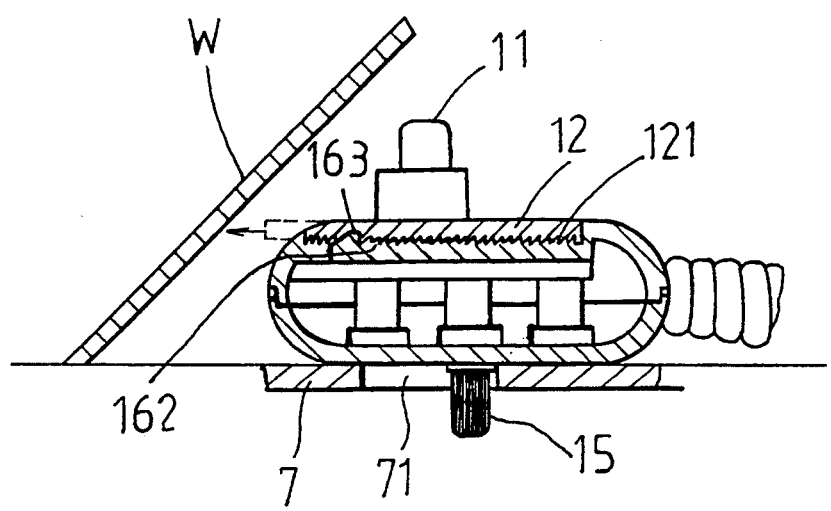
FIG. 4 is a diagram showing the operation of the present invention.

In practical operation, to fix the securing device of the present invention to the interior of a vehicle, a person only has to selectively engage two bolts 15 with two of the screw holes 17 according to the distance between two proper ventilation outlets 71, as shown in FIGS. 4, 5, with the bolts 15 in abutment against the sides of the outlets 71. Afterwards, the slide board 12 is pushed outwardly to abut against the windshield W; in the meanwhile, the adjustable contact member 11 is also pulled upwardly to abut against the windshield W whereby the bolts 15, the slide board 12 and the contact member 11 constitutes three-point retaining of the fixing unit 1.

Referring to FIGS. 4, 5A, the slide board 12 can be retractably pushed backwardly as long as it is pressed downwardly against the resilient abutment piece 163, causing the teeth 121 to disengage from the teeth 162. In the same way, the adjustable contact member 11 can be pushed downwardly if it is slightly forced one side, making the teeth 111 separated from the detention teeth 131 of the mounting seats 13.

Figure 6:
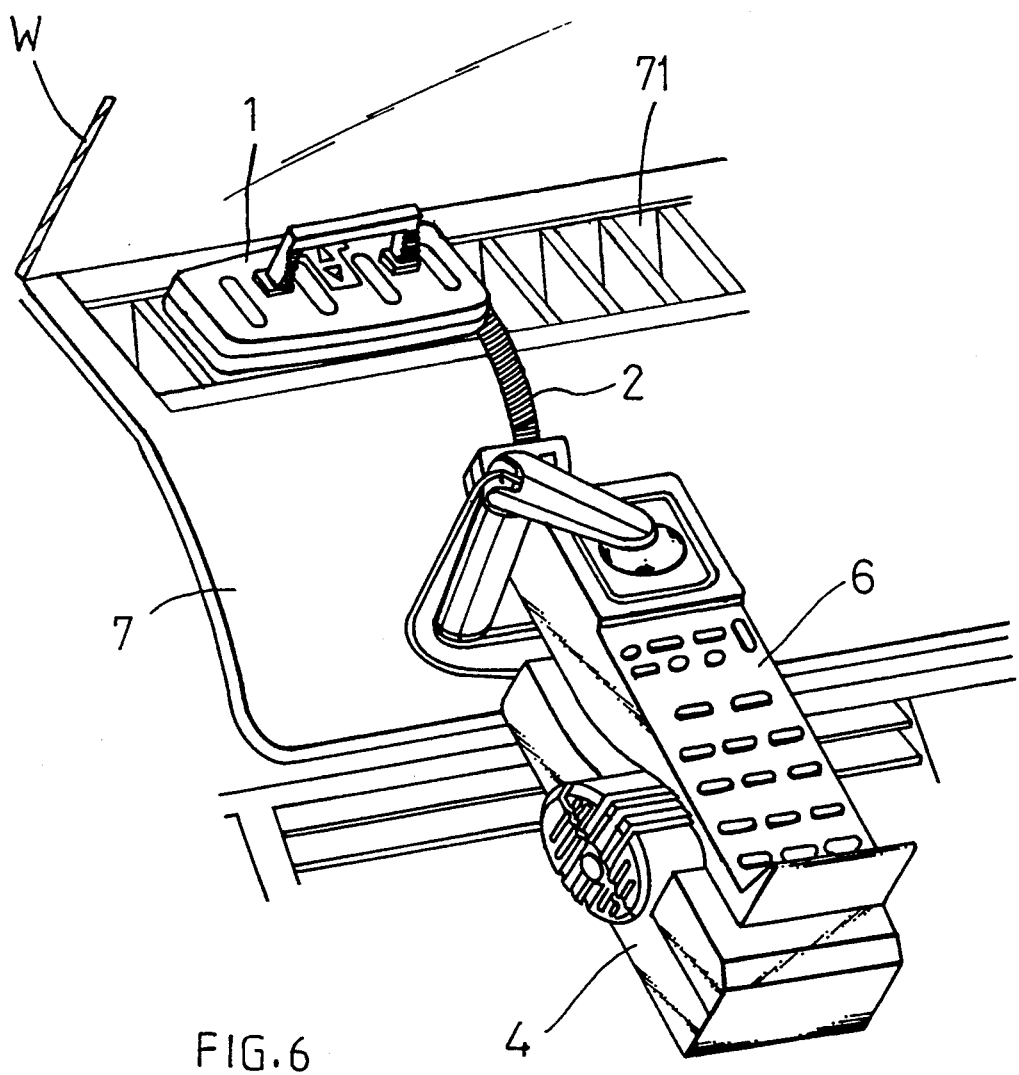
FIG. 6 is a diagram showing the securing of a cellular phone by way of the present invention.

Referring to FIG. 6, the flexible tube 2 permits the phone securing mount 4 to be adjusted into a proper place so as to make the phone securing mount 4 having a double-sided sticker 4' to be easily adhered to a flat place of the front board 7 of a vehicle. A cellular phone 6 is placed in the phone securing mount 4.

I claim:

1. A cellular phone securing device for use on a vehicle, comprising a fixing unit, a flexible tube, a linkage rod, a phone securing mount, said fixing unit being connected to said flexible tube at one end and said flexible tube being coupled to said linkage rod, and said linkage rod being connected to said phone securing mount; the phone securing device being characterized in that said fixing unit has a horizontally movable slide board and a vertically adjustable contact member and a pair of bolts which are selectively engaged with holes disposed on the underside of said fixing unit; said fixing unit has a recess at the center thereof and a resilient abutment piece is located at the center of said recess and abuts against the bottom of said slide board; said recess is provided with a pair of slide tracks so as to permit said slide board to be adjustably moved therein; said slide board is provided with a plurality of teeth on each of two parallel sides thereof; each said slide track has a plurality of teeth disposed in correspondence to the teeth on said slide board in such a manner that said slide board is only one way moveable; said fixing unit is provided with first and second mounting seats so as to permit said adjustable contact member to be adjustably moved in said mounting seats; said contact member is U-shaped with first and second legs, a plurality of teeth are disposed on the first and second legs, so that the first and second legs are engaged with a detention tooth disposed on the first and second mounting seats respectively, and limiting said adjustable contact member to be only one way movable; said fixing unit being mounted inside a vehicle by first inserting said two bolts in outlets of a ventilation system of a vehicle, and then pushing said slide board and said contact member simultaneouly in abutment against a Windshield of said vehicle whereby said fixing unit is retained in place as a result of three-point contact; said phone securing mount having a double-sided sticker which is adhesive adhered to a flat surface of a panel board of said vehicle.

* * * * *